United States Patent [19]
Witman et al.

[11] 3,857,868
[45] Dec. 31, 1974

[54] PREPARATION OF DIMETHYLTIN DICHLORIDE

[75] Inventors: Robert C. Witman; Thomas G. Kugele, both of Cincinnati, Ohio

[73] Assignee: Cincinnati Milacron, Reading, Ohio

[22] Filed: Jan. 8, 1973

[21] Appl. No.: 321,980

[52] U.S. Cl. .................................. 260/429.7
[51] Int. Cl. .................................. C07f 7/22
[58] Field of Search .......................... 260/429.7

[56] References Cited
UNITED STATES PATENTS

| | | | |
|---|---|---|---|
| 3,414,595 | 12/1968 | Oakes | 260/429.7 |
| 3,415,857 | 12/1968 | Hoye | 260/429.7 |
| 3,446,826 | 5/1969 | Coates et al. | 260/429.7 |
| 3,519,665 | 7/1970 | Molt | 260/429.7 |
| 3,651,108 | 3/1972 | Giannaccari et al. | 260/429.7 |
| 3,745,183 | 7/1973 | Katsumura et al. | 260/429.7 |

*Primary Examiner*—Patrick P. Garvin
*Assistant Examiner*—A. P. Demers
*Attorney, Agent, or Firm*—Cushman, Darby & Cushman

[57] ABSTRACT

Dimethyltin dichloride is prepared by catalytic reaction from tin and methyl chloride with a controlled feed of methyl chloride to prevent too high a pressure. The preferred catalyst is a lower trialkyl amine. The catalyst is relative inexpensive and can be discarded after use.

25 Claims, 3 Drawing Figures

PREPARATION OF DIMETHYLTIN DICHLORIDE

The present invention is directed to the preparation of dimethyltin dichloride from tin and methyl chloride.

A number of catalytic processes have been developed for the preparation of dimethyltin dichloride from metallic tin and methyl chloride. For practical yields the best of these have required iodine containing catalysts (see Molt U.S. Pat. No. 3,519,665 and Nitto (British) Pat. No. 1,053,996). Due to the presence of the iodine these catalysts are expensive and it is necessary to distill the product to recover the catalyst as a distillation residue. This distillation is time consuming and adds to the overall cost of the process.

It would be desirable to develop a process which employs a low cost discardable catalyst which eliminates the requirement for using iodine (including iodine containing compounds) and/or necessity for distillation to recover the catalyst.

It has now been found that catalysts can be used which do not contain iodine and the distillation step to recover the catalyst can be avoided providing certain specific types of catalyst are used and control is kept on the temperature and pressure during the reaction. The cited Nitto patent, for example, charges all of the methyl chloride at once in examples 1 – 4 and operates at or above the critical temperature of 143.1°C. at or above the critical pressure of 65.8 atmospheres (952 psig).

The reaction involved is as follows:

$Sn + 2\ MeCl \xrightarrow{cat}{\Delta} Me_2SnCl_2$

At the same time, other possible reactions, such as the following, are avoided or kept to a minimum:

$Me_2SnCl_2 + Sn + MeCl \xrightarrow{cat}{\Delta} Me_3SnCl + SnCl_2$ or, $Me_2SnCl_2 + Sn + 2\ MeCl \xrightarrow{cat}{\Delta} Me_4Sn + 2\ SnCl_2$ or, $4\ Me_3SnCl + Sn \xrightarrow{cat}{\Delta} 3\ Me_4Sn + 2\ SnCl_2$.

In the process of the invention, it has been found desirable to add a little dimethyltin dichloride at the start of the reaction as a reaction medium and solvent for the methyl chloride. Since dimethyltin dichloride is the prevalent product of the reaction the amount of dimethyltin dichloride added initially is not critical. Desirably there is used at the start of the reaction at least enough dimethyltin dichloride to be capable of agitation in the reactor and to cover the tin, which is usually on the order of 15 percent of the reactor volume. Instead of dimethyltin dichloride there can be used as a solvent other innocuous organic solvents such as e.g., quaternary ammonium chlorides, organic ethers, e.g., dibutyl ether and the like or mixtures of these with hydrocarbon solvents. However, these may require separation from the product after the reactions and hence dimethyltin dichloride is preferred.

The methyl chloride is added as a gas and is normally added until the reactor is filled with product, or until no more is absorbed, indicating exhaustion of the tin. The product is then pumped over, leaving in the reactor such quantity as may be desired as a medium for the next reaction.

The reaction is usually carried out at about 0.005 to 0.02 moles of catalyst per gram atom of tin although this can be varied.

The temperature, pressure and amount of catalyst affect the reaction. The solubility of methyl chloride in the reaction medium increases with increase in pressure. This increases the speed of the reaction as does an increase in temperature. Thus, in the range of 170° to 215°C. With trimethyl amine catalyst the rate of reaction approximately doubles for every 20°C. increase in temperature.

The three preferrrd types of catalyst employed are:

a. tetraalkyl ammonium chloride, $R_4NCl$;

b. tetraalkyl ammonium trichlorostannite, $R_4NSnCl_3$; and c. trialkyl amine, $R_3N$;

wherein each alkyl group independently contains 1 to 4 carbon atoms. The preferred catalyst is trimethyl amine, though all of the catalysts (a), (b) and (c) are approximately equally effective on a molar basis at low concentrations.

Examples of catalysts within groups (a), (b) and (c) are tetramethyl ammonium chloride, tetraethylammonium chloride, tetrapropylammonium chloride, tetrabutylammonium chloride, trimethyl ethyl ammonium chloride, methyl tributyl ammonium chloride, tetramethyl ammonium trichlorostannite, tetraethyl ammonium trichlorostannite, tetrapropyl ammonium trichlorostannite, tetrabutyl ammonium trichlorostannite, methyl tributyl ammonium trichlorostannite, trimethylamine, triethyl amine, tripropyl amine, tributyl amine, dimethylethyl amine, triisopropyl amine, tri sec. butyl amine.

Theoretically in the reaction both catalysts (a) and (c) are ultimately converted to (b) but there have been noted certain differences in reactivity. With catalysts (a) and (b) the more catalyst put in, the faster the reaction goes. With catalyst (c), however, if too much catalyst is employed the reaction may be stopped completely.

If too much catalyst (a), (b) or (c) is used there may be difficulties in subsequently separating a product such as dimethyltin bis (isooctyl thioglycolate) from an aqueous phase used is making or washing the product.

Ammonia also will catalyze the reaction but is not as good a catalyst as a trialkyl amine. If too much ammonia is present, moreover, it may change the proportions of mono-, di- and trimethyltin chloride formed. Thus, too much ammonia under some conditions favors formation of trimethyltin chloride, e.g., in an amount of 40 percent of the total product, along with significant amounts of $SnCl_2$. This, of course, reduces the yield of the desired dimethyltin dichloride.

As smaller pieces of metallic tin are used, the reaction rate increases to a point. However, it is not necessary to use finely divided tin ordinarily, and below a certain limit the size of the tin pieces is immaterial. Generally tin chips are satisfactory. The only question is how fast the methyl chloride can be put in solution.

Increasing the temperature does not lower the reaction rate as such, but it does reduce the amount of methyl chloride, which can be forced into solution in the reaction medium if the pressure is kept constant and for this reason also too high a temperature is not permitted.

At temperatures of 200° – 230°C. there have not been noticed any disadvantages using a pressure of 200 psig. The reaction can even be run at 150°C.

The pressure can be as low as 150 psig but at this pressure an increase in the amount of catalyst is required to maintain a good rate of reaction. At a pressure of 60 psig the tin consumption falls off if the amount of catalyst, time of reaction and pressure are kept constant. The reaction will proceed at very high pressures but for practical reasons of equipment the pressure should preferably not be over about 400 psig.

It has been found that good stirring or other means of homogeneously distributing the methyl chloride in the solvent is desirable to maximize the reaction rate and prevent byproduct formation.

The reaction is not particularly dependent on the concentration of the catalyst. Thus, using one-half pound of trimethyl amine catalyst and 25 pounds of dimethyltin dichloride as the solvent there were obtained 150 pounds of dimethyltin dichloride product while using the same amount of tin but one-fourth pound of trimethyl amine in 75 pounds of dimethyltin dichloride there were obtained 200 pounds of dimethyltin dichloride product. Desirably, the amount of catalyst is between 0.0025 and 0.05 moles per gram atom of tin to be reacted.

The minimum amount of catalyst is not critical. Two hunderd grams of catalyst to 60–65 pounds of tin have been found to be effective. As little as 0.02 mol of tetramethyl ammonium chloride can be used to react methyl chloride with 4 grams-atoms of tin to form dimethyltin dichloride with a rate of addition of methyl chloride of 0.80 grams MeCl/min.

The process of the present invention, unlike that of the Nitto patent, can be carried out continuously. Pressures as low as 60 psig do not permit continuous operation. Preferably the maximum temperature is the melting point of tin, i.e., about 231.9°C., though temperatures up to about 250°C. may be used, particularly if means are provided for dispersing the molten tin or otherwise presenting a large surface.

As has been previously pointed out, there is preferably employed trimethyl amine since having a lower molecular weight, it is effective in smaller absolute amounts than higher alkyl amines. However, there can be employed compounds of the formula

where $R_1$, $R_2$ and $R_3$ are alkyl, aralkyl, aryl or hydrogen, $R_4$ is alkyl, aryl, aralkyl, Hydrogen for nothing, $R_5$ is X, $SnX_3$ or nothing and where X is a halogen of atomic weight 35 to 80. If $R_4$ is nothing, then $R_5$ also is nothing if $R_1$, $R_2$, $R_3$, $R_4$ are all hydrogen, then $R_5$ is bromine. Thus, there can be used mono methyl amine, dimethyl amine, trimethyl amine, monoethyl amine, diethyl amine, triethyl amine, dimethyl ethyl amine, tripropyl amine, triisopropyl amine, tributyl amine, trioctyl amine, diamylhexyl amine, trilauryl amine, bis octadecyl amine, tribenzyl amine, aniline, N-methyl aniline, N,N-dimethyl aniline, toluidine, N-methyl toluidine, N,N-dimethyl toluidine, N,N-diethyl aniline, tetramethyl ammonium chloride, trimethyl ethyl ammonium chloride, tetramethyl ammonium bromide, tetraethyl ammonium chloride, tetraethyl ammonium bromide, trimethyl phenyl ammonium chloride, trimethyl benzyl ammonium chloride, trimethyl benzyl ammonium bromide, trimethyl octadecyl ammonium chloride, diethyl dibutyl ammonium bromide, trimethyl cetyl ammonium chloride, tetramethyl ammonium trichlorostannite, tetramethyl ammonium tribromostannite, tetramethyl ammonium dichlorobromostannite, trimethyl ethyl ammonium trichlorostannite, tetraethyl ammonium trichlorostannite, tetrabutyl ammonium tribromostannite, trimethyl octadecyl ammonium trichlorostannite, triethyl benzyl ammonium trichlorostannite, trimethyl phenyl ammonium trichlorostannite, tetrabenzyl ammonium chloride, tetraphenyl ammonium chloride, tetraphenyl ammonium trichlorostannite, tetrabenzyl ammonium trichlorostannite.

Catalysts can also be prepared by reacting an amine, alkyl chloride with a chloride (or bromide) of any polyvalent metal or reaction of a quaternary ammonium compound with the polyvalent metal chloride (or bromide) e.g., zinc chloride, lead chloride, ferrous chloride, ferric chloride, cupric chloride, cobaltous chloride, nickelous chloride, zinc bromide, aluminum chloride, titanium tetrachloride, zirconium chloride, tin dichloride, tin dibromide, magnesium chloride, calcium chloride.

It is understood that catalyst, as set forth in the claims, includes quaternary ammonium halides prepared previously or in situ with the polyvalent metal halides listed above.

Unless otherwise indicated all parts and percentages are by weight.

The fact that trimethyl amine or tetramethyl ammonium chloride or tetramethyl ammonium bromide gives good yields of dimethyltin dichloride is particularly surprising in view of Molt U.S. Pat. No. 3,519,665 which discloses in Example 4 that very little tin is consumed when employing tetramethyl ammonium iodide under the conditions of that Example.

In the following Table I, with Examples 1–18, there were used 475 grams of tin and 150 grams of dimethyltin dichloride as a solvent as starting materials. Methyl chloride was added at the indicated rates. In Example 15, carried out at 235°C. the tin was molten and not dispersed. In Example 9, one inch tin bars were used. In the other Examples the tin was in the form of chips, except in Example 18 where the tin was in the form of balls. The pressure was maintained by adding methyl chloride as it reacted in the Examples.

TABLE I

| Example | Catalyst | Grams | Rate of MeCl Usage (grams/minute) | % Tin Reacted | Pressure (psig) | Temperature (°C) |
|---|---|---|---|---|---|---|
| 1 | Me$_3$N | 10 (0.169 mol) | 3.3 | | 200 | 200 |

TABLE I—Continued

| Example | Catalyst | Grams | Rate of MeCl Usage (grams/minute) | % Tin Reacted | Pressure (psig) | Temperature (°C) |
|---|---|---|---|---|---|---|
| 2 | $Me_3N$ | 10 | 0 | | 60 | 200 |
| 3 | $Me_3N$ | 10 | 1.2 | | 200 | 175 |
| 4 | $Me_3N$ | 10 | 2.5 | 100 | 200 | 190 |
| 5 | $Me_3N$ | 5 (0.085 mol) | 2.6 | | 200 | 200 |
| 6 | $Me_3N$ | 5 | 4.0 | | 200 | 215 |
| 7 | $Me_3N$ | 2.5 (0.043 mol) | 1.9 | | 200 | 210 |
| 8 | None | None | 0 | | 200 | 220 |
| 9 | $Me_3N$ | 10 | 1.4 | | 200 | 220 |
| 10 | $Bu_3N$ | 10 (0.054 mol) | 0.9 | | 200 | 215 |
| 11 | $Me_3N$ MeI | 10  1 | 3.3 | | 200 | 200 |
| 12 | $Me_3N$ $I_2$ | 10  1 | 3.1 | | 200 | 200 |
| 13 | $Et_3N$ | 5.5 (0.054 mol) | 0.9 | | 200 | 210 |
| 14 | $Me_3N$ | 1.0 | 0.80 | | 200 | 215 |
| 15 | $Me_3N$ | 1.0 | 0.50 | | 200 | 235 |
| 16 | $Me_4NCl$ | 2.0 (0.018 mol) | 0.80 | 100 | 200 | 210 |
| 17 | $Bu_3NMeSnCl_3$ | 21.5 | 1.67 | 100 | 200 | 215 |
| 18 | $Me_4NCl$ | 5.5 (0.05 mol) | 1.75 | 90 | 200 | 210 |
| 19 | $Me_4NCl$ | 2.2 | 1.0 | 70 | 200 | 60 |
| 20 | $Me_4NI$ | 5.5 (0.027 mol) | | | 200 | 200 |
| 21 | $NH_4BR$ | 9.8 | 0.4 | | 200 | 210 |
| 22 | $Me_4NCl$ | 5.5 | 3.3 | | 400 | 210 |
| 23 | $Me_3N$ | 3.0 | 3.1 | | 400 | 275 |
| 24 | $Me_2NH$ | 5.0 | 1.4 | | 200 | 210 |

Figure 1:
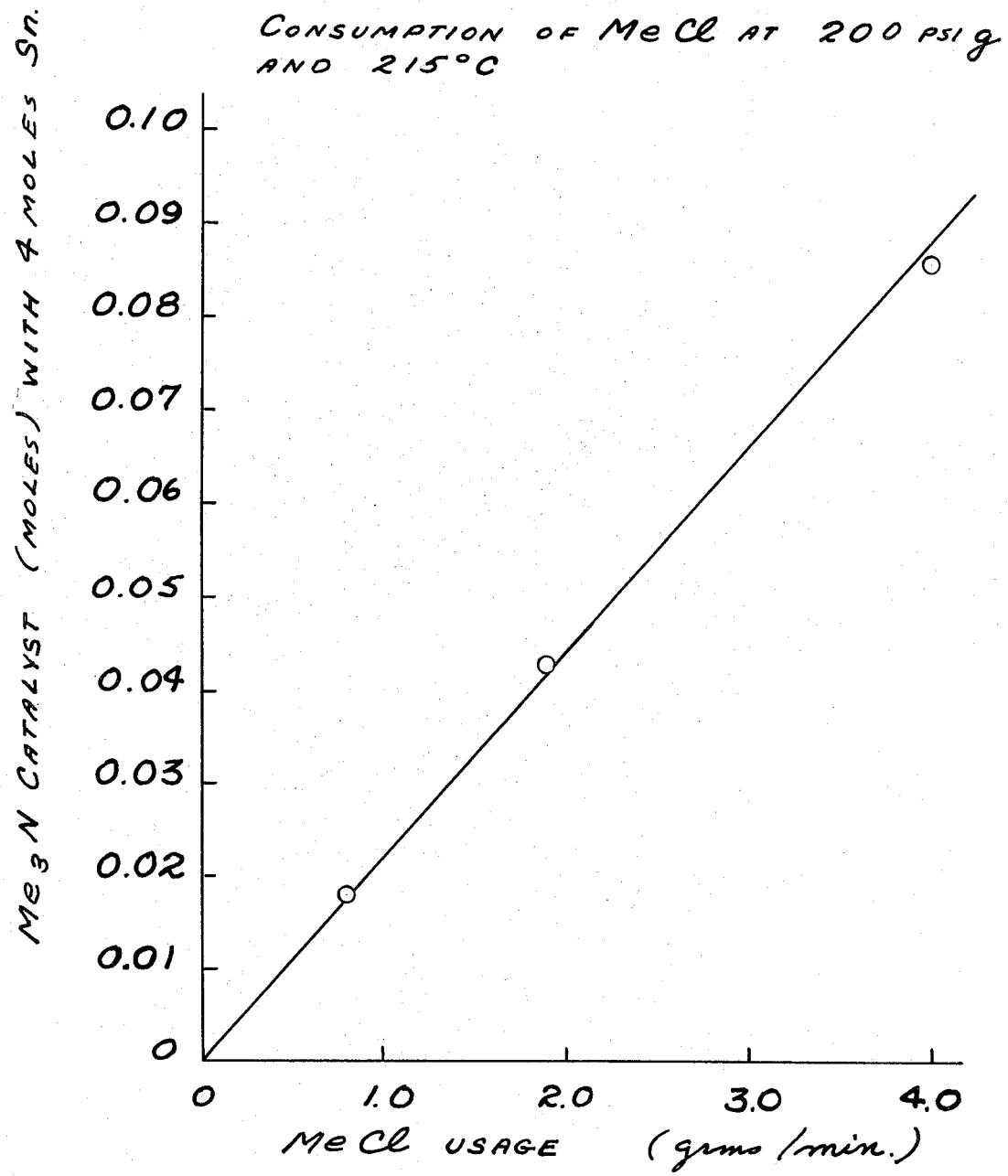
FIG. 1 is a graph of methyl chloride consumption against amount of trimethyl amine catalyst at constant temperature and pressure.

From FIG. 1 it can be seen that the consumption of methyl chloride shows a straight line increase with the amount (gram-moles) of trimethyl amine catalyst employed at a constant amount of tin (4 gram-atoms) and a constant pressure (200 psig) and constant temperature (215° C.). Since tetramethyl ammonium chloride is formed in situ the same straight line curve applies.

Figure 2:
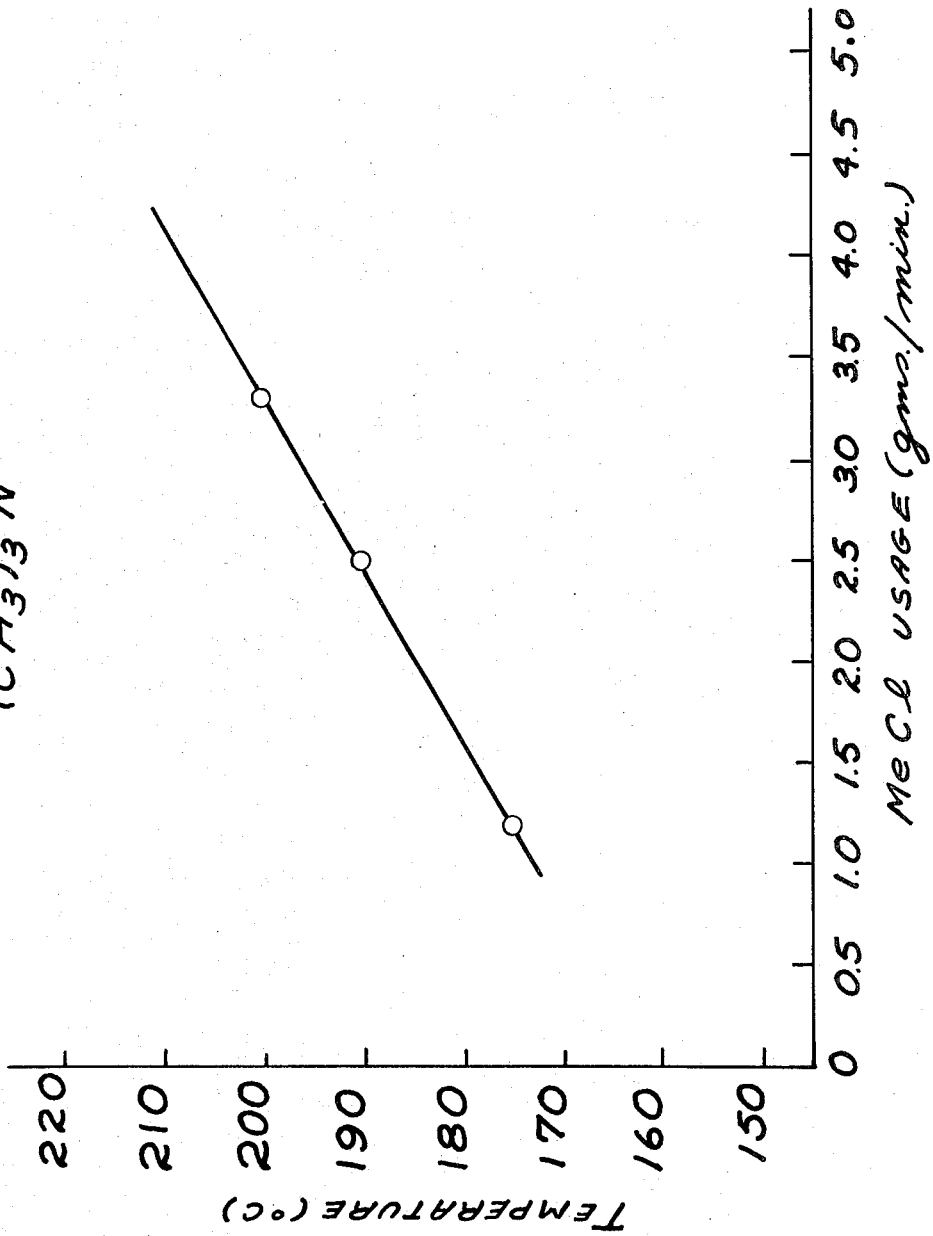
FIG. 2 is a graph of methyl chloride consumption at increasing temperature and constant pressure with a constant amount of trimethyl amine catalyst.

From FIG. 2 it can be seen that at constant pressure (200 psig) and constant amount of trimethyl amine (10 grams) with 4 gram atoms of tin there is an increase in the amount of methyl chloride consumed which is double for every increase of 20° C. in the range of 170° to 215° C. This would also be true for tetramethyl ammonium chloride once the reaction was initiated.

Figure 3:
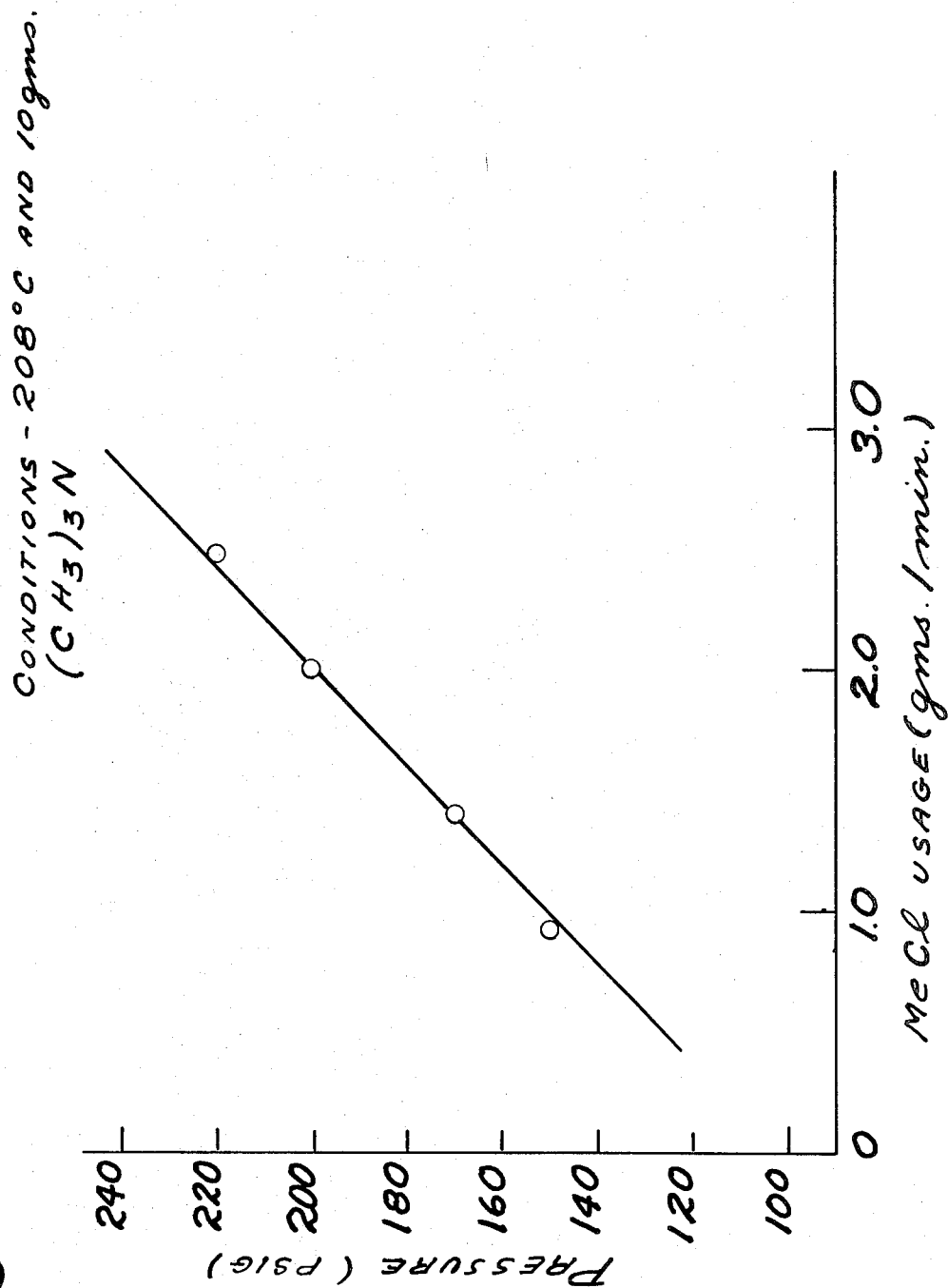
FIG. 3 is a graph of methyl chloride consumption at increasing pressure at constant temperature with a constant amount of trimethyl amine catalyst.

From FIG. 3 it can be seen that at constant temperature (208° C.) and constant amount of trimethyl amine (10 grams) with 4 gram atoms of tin there is a straight line increase in methyl chloride consumption in the pressure range of 120 to 240 psi (0.4 gram/min) for each 20 psi increase in pressure.

In the following Table II the rate of methyl chloride usage at 215° C. was determined by assuming the increase of 2 times for each 20° C. was shown in FIG. 1 was true in all cases. The extrapolated hours for complete reaction at 215° C. was similarly determined by the amount of tin and the conversion results thus obtained for Example 15 necessarily are hypothetical but emphasize the disadvantage in using molten tin, which has not been dispersed or in some other way given a large surface area.

TABLE II

| Example | Rate of Methyl Chloride Usage (grams/minute) if at 215° C. | Extrapolated Hours for Complete Reaction at 215° C. |
|---|---|---|
| 5 | 4.0 | 1.7 |
| 6 | 4.2 | 1.6 |
| 7 | 2.3 | 2.9 |
| 10 | 0.9 | 7.5 |
| 13 | 1.1 | 6.1 |
| 14 | 0.8 | 8.4 |
| 15 | 0.25 | 26.9 |
| 20 | 1.7 | 4.0 |

As can be seen from Table I and FIG. 2 the advantage in using tetramethyl ammonium iodide as against tetramethyl ammonium chloride on an equimolar basis is relatively small at elevated temperature and pressure. Thus with 0.027 moles of catalyst at 200 psig and 215°C. with the iodide catalyst the rate of methyl chloride consumption is 1.6 – 1.7 grams/minute and with the chloride 1.25 grams/minute. With equal weight amounts of catalyst 5.5 grams the rates of methyl chloride consumption are 1.6 – 1.7 grams/minute for the iodide and 2.25 grams/minute for the chloride.

The dimethyltin dichloride which is not pumped over can be used as solvent for the next run. It should be remembered that it contains a proportionate amount of the tetramethyl ammonium chloride catalyst, for example, and hence the amount of new catalyst added can be reduced to compensate therefor.

EXAMPLE 25

The reactor was charged with 474 g. tin fines, 125 g. methyltributylammonium chloride and heated at 205 psig methyl chloride pressure at a temperature of 210°C. for 6 hours. Reduced pressure distillation yielded 998 grams consisting of 968 grams of $Me_2SnCl_2$, 18 grams of $MeSnCl_3$ and 11 grams of $Me_3SnCl$.

This Example shows the preparation of dimethyltin dichloride without the use of dimethyltin dichloride as the reaction medium solvent.

What is claimed is:

1. In a process of preparing dimethyltin dichloride by reacting metallic tin with methyl chloride in the presence of a catalyst, the improvement comprising carrying out the reaction in the presence of a catalyst having the formula:

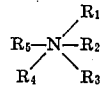

where $R_1$, $R_2$, and $R_3$ are alkyl of 1 to 18 carbon atoms, benzyl, phenyl, tolyl or hydrogen, $R_4$ is alkyl of 1 to 18 carbon atoms, benzyl, phenyl, tolyl, hydrogen or nothing, $R_5$ is X or $-SnX_3$ when $R_4$ is alkyl, phenyl, tolyl, benzyl or hydrogen and $R_5$ is nothing when $R_4$ is nothing with the proviso that when $R_1$, $R_2$, $R_3$ and $R_4$ are all hydrogen then X must be Br, and X is a halogen of atomic weight 35 to 80 at a temperature of 150° to 300°C. at a pressure of 60 to 400 psig, there being present a solvent for the methyl chloride at the start of the reaction.

2. A process according to claim 1, wherein X is chlorine.

3. A process according to claim 1, wherein there is used at least 0.0025 gram-mole of catalyst per gram-atom of tin.

4. A process according to claim 3, carried out at a temperature of 150° to 230°C. and a pressure of at least 150 psig.

5. A process according to claim 1, wherein $R_4$ and $R_5$ are nothing.

6. A process according to claim 1, wherein $R_4$ is alkyl of 1 to 18 carbon atoms, phenyl, tolyl or benzyl and $R_5$ is X.

7. A process according to claim 1, wherein $R_4$ is alkyl of 1 to 18 carbon atoms, phenyl, tolyl or benzyl and $R_5$ is $SnX_3$.

8. A process according to claim 1, wherein $R_1$, $R_2$ and $R_3$ are methyl, and $R_4$ is methyl or nothing.

9. A process according to claim 8, wherein $R_4$ is methyl and $R_5$ is chlorine.

10. A process according to claim 8, wherein $R_4$ is methyl and $R_5$ is $^-SnCl_3$.

11. A process according to claim 8, wherein $R_4$ and $R_5$ are nothing.

12. A process according to claim 11, wherein the reaction is carried out at a temperature of 150° to 230°C. at a pressure of at least 150 psig.

13. A process according to claim 12, wherein the reaction is carried out at a temperature of 190° to 220°C. at a pressure of 180 to 220 psig.

14. A process according to claim 13, wherein the reaction is carried out at a temperature of 200° to 215°C. and a pressure of 200 psig.

15. A process according to claim 8, wherein the reaction is carried out at a temperature of 150° to 230°C. at a pressure of at least 150 psig.

16. A process according to claim 15, wherein the reaction is carried out at a temperature of 190° to 220°C. at a pressure of 170 to 220 psig.

17. A process according to claim 1, wherein the temperature is from 150°C. to just below the melting point of tin.

18. A process according to claim 1, wherein the solvent is dimethyltin dichloride.

19. A process according to claim 1, wherein the solvent is selected from the group consisting of dimethyltin dichloride, quaternary ammonium chlorides and ethers.

20. A process according to claim 3 wherein the amount of catalyst is between 0.005 and 0.02 gram-moles per gram atom of tin.

21. A process according to claim 1, carried out continously at a pressure of at least 150 psig.

22. A process according to claim 1 where said catalyst is the sole catalyst.

23. A process according to claim 1 wherein $R_1$, $R_2$, $R_3$ and $R_4$ are all alkyl of 1 to 4 carbon atoms.

24. A process according to claim 23 wherein $R_5$ is $SnX_3$.

25. A process according to claim 1 wherein methyl chloride is fed at a controlled rate to maintain the pressure at 60 to 400 psig.

* * * * *